(12) United States Patent
Curtis

(10) Patent No.: US 12,450,184 B2
(45) Date of Patent: Oct. 21, 2025

(54) DEVICE AND METHODS FOR COMMUNICATION BETWEEN ELECTRONIC COMPONENTS

(71) Applicant: Microchip Technology Incorporated, Chandler, AZ (US)

(72) Inventor: Keith Curtis, Queen Creek, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 17 days.

(21) Appl. No.: 18/632,143

(22) Filed: Apr. 10, 2024

(65) Prior Publication Data

US 2024/0370394 A1 Nov. 7, 2024

Related U.S. Application Data

(60) Provisional application No. 63/464,481, filed on May 5, 2023.

(51) Int. Cl.
| | |
|---|---|
| *G06F 15/173* | (2006.01) |
| *G06F 12/08* | (2016.01) |
| *G06F 13/24* | (2006.01) |
| *G06F 13/28* | (2006.01) |
| *G06F 13/40* | (2006.01) |

(52) U.S. Cl.
CPC ............ *G06F 13/28* (2013.01); *G06F 13/24* (2013.01); *G06F 13/409* (2013.01)

(58) Field of Classification Search
None
See application file for complete search history.

(56) References Cited

U.S. PATENT DOCUMENTS

| | | | |
|---|---|---|---|
| 9,256,558 B2 | 2/2016 | Litch et al. | |
| 2007/0079017 A1* | 4/2007 | Brink | G06F 13/385 710/22 |
| 2009/0006662 A1* | 1/2009 | Chen | G06F 13/28 710/22 |
| 2012/0191882 A1 | 7/2012 | Nagai et al. | 710/22 |
| 2014/0304436 A1* | 10/2014 | Mortensen | G06F 13/10 710/18 |
| 2014/0331034 A1* | 11/2014 | Ponce | G06F 1/24 713/1 |

(Continued)

OTHER PUBLICATIONS

ST Microelectronics, "Deserial Serial Peripheral Interface (DSPI)," URL: https://www.st.com/content/ccc/resource/technical/document/reference_manual/group0/76/49/16/39/79/3d/40/16/DM00239196/files/DM00239196.pdf/jcr:content/translations/en.DM00239196.pdf, 98 pages, Jan. 31, 2021.

(Continued)

*Primary Examiner* — Hyun Nam
(74) *Attorney, Agent, or Firm* — SLAYDEN GRUBERT BEARD PLLC

(57) ABSTRACT

A system may include a communication circuit as part of a microcontroller. One or more registers may be configured to enable communication between the communication circuit and one or more external peripherals without a CPU or other processor controlling the communication. The one or more registers may be configured to allow a specific trigger event to initiate communication between the communication circuit and the external peripheral. A DMA controller may transmit data from the communication circuit to a memory and may transmit data from the memory to the external peripheral.

19 Claims, 4 Drawing Sheets

(56) References Cited

U.S. PATENT DOCUMENTS

| | | | |
|---|---|---|---|
| 2015/0006765 A1 | 1/2015 | Litch et al. | 710/22 |
| 2017/0185519 A1* | 6/2017 | Marshall | G06F 12/0891 |
| 2019/0265976 A1* | 8/2019 | Goryavskiy | G06F 9/30058 |
| 2020/0167300 A1* | 5/2020 | Kunz | G06F 13/4022 |
| 2024/0370394 A1* | 11/2024 | Curtis | G06F 13/28 |
| 2025/0165417 A1* | 5/2025 | Han | G06F 9/544 |
| 2025/0173264 A1* | 5/2025 | Bhunia | G06F 12/08 |

OTHER PUBLICATIONS

International Search Report and Written Opinion, Application No. PCT/US2024/027947, 11 pages, Sep. 9, 2024.

\* cited by examiner

DEVICE AND METHODS FOR COMMUNICATION BETWEEN ELECTRONIC COMPONENTS

PRIORITY

This application claims priority to commonly owned U.S. patent application Ser. No. 63/464,481 filed May 5, 2023, the entire contents of which are hereby incorporated by reference for all purposes.

FIELD OF THE INVENTION

The present disclosure relates to systems and methods for communication between electronic components.

BACKGROUND

A microcontroller generally comprises a central processing unit (CPU), program and data storage memory, input-output (I/O) ports and a plurality of peripherals fabricated on an integrated circuit (IC) die ("chip"). Some of these peripherals may be core independent peripherals (CIPs), which are defined as peripherals that may operate without requiring continued input from the CPU. CIPs may be initially configured by a microcontroller, and then may operate independently after configuration. The IC die may be enclosed, or encapsulated, in an IC package having connection terminals to which external circuits may be connected to the IC die. Electrical connection points on the IC die may be "pads" and may be connected to the IC package pins with bonding wires. Most of the external connection pins are associated with an I/O port of the microcontroller, wherein each I/O port pin is fixedly associated with one bit of an I/O port. Respective IC die pads are used for these I/O ports and wire bonded to the respective external pins. Other external pins provide IC die DC power and ground. The I/O port pins are often called multi-function pins and can be shared under program control with a peripheral. To this end, certain predefined associations may exist for each pin or a so-called peripheral port selection (PPS) logic may allow for selection of a variety of assignable peripheral functions.

CIPs may handle their tasks with no code execution by or supervision from a central processing unit (CPU) to maintain operation of the external peripheral. Such peripherals may be termed Core Independent Peripherals (CIPs). As a result, CIPs simplify the implementation of complex control systems and give designers the flexibility to innovate. CIPs are internally integrated and may receive inputs from internal and external sources and may provide outputs to internal and external targets, such as other integrated peripherals or external components.

However, not all core independent peripherals (CIPs) have all of their input and/or output connections available to every other CIP, but they may have one or more connection only available to respective external pins. To make connections between different CIPs that are not within the normal internal selection options, it is necessary to make that connection using an external port pin. On low pin count devices this may be problematic as it might cause functionality to be reduced. Therefore, a larger device must be used with a respective number of extra port pins. The main drawbacks are cost and size of the larger device. The other option is to significantly increase the connection selection register and associated multiplexer circuitry for all CIPs to allow selection of any of the other CIPs for connection thereto which in most cases is not a viable option.

The specific CIPs included in a specific chip is a hardware decision that must be made based on the market requirements and performance capabilities. A chip targeted for a different market with different performance capabilities may have an entirely different set of included CIPs which necessitates another entire chip development. Alternatively, additional peripherals may be attached external to the CPU, and the CPU may communicate with these external peripherals using an existing protocol, such as SPI or I2C communication. However, this requires significant latency in communicating over an external bus, and also may destroy the independent nature of CIPs since the CPU needs to be active to communicate with these external peripherals.

There is a need for a system and method of communication with external peripherals which allows the external peripherals to operate as CIPs, with no code execution or supervision of a CPU.

SUMMARY

The examples herein enable a system for communication between electronic components without the need for a CPU or other processor to be active.

According to one aspect, a device includes a microcontroller. The microcontroller includes a communication circuit, a central processing unit (CPU), a direct-memory access (DMA) controller and a memory. The communication circuit may be coupled to the CPU, the DMA controller and an external peripheral. The communication circuit may include: a trigger configuration register to store trigger configuration settings, an address configuration register to store an address of the external peripheral, a count configuration register to store a numerical value and at least one trigger input. The communication circuit may enter a peripheral communication mode based on the trigger configuration settings and a trigger event on the at least one trigger input. The communication circuit may transfer a number of bytes between the communication circuit and the external peripheral addressed by the address stored in the address configuration register. The number of bytes transferred may be based on the numerical value stored in the count register. The communication circuit may exit the peripheral communication mode based on completion of the transfer of the number of bytes and based on the trigger configuration settings. The DMA controller may transfer data between the communication circuit and the memory.

According to one aspect, a system includes an external peripheral and a microcontroller coupled to the external peripheral. The microcontroller may include a communication circuit, a CPU, a DMA controller and a memory. The communication circuit may be coupled to the CPU and the DMA controller. The communication circuit may include: a trigger configuration register to store trigger configuration settings, an address configuration register to store an address of the external peripheral, a count register to store a numerical value and at least one trigger input. In operation, the communication circuit may enter a peripheral communication mode based on trigger configuration settings in the trigger configuration register and a trigger event on the at least one trigger input. The communication circuit may transfer a number of bytes between the communication circuit and the external peripheral addressed by the address stored in the address configuration register, the number of bytes transferred based on the numerical value stored in the count register. The communication circuit may exit the peripheral communication mode based on configuration settings in the trigger configuration register. The DMA controller may transfer data between the communication circuit and a memory.

According to one aspect, a method includes steps of writing to one or more configuration registers in a communication circuit, configuring a DMA controller to transfer data between the communication circuit and a memory, receiving a trigger signal at the communication circuit, the trigger signal specified by values stored in at least one of the configuration registers, transferring data between an external peripheral and the communication circuit, the address of the external peripheral based upon a value stored in at least one the configuration registers, and the number of bytes of data to transfer based on a numerical value stored in at least one of the configuration registers, terminating the communication based upon completion of the transferring of data and based on a value stored in at least one of the configuration registers, and transferring data between the communication circuit and the memory based on the configuration of the DMA controller.

DETAILED DESCRIPTION

Figure 1:
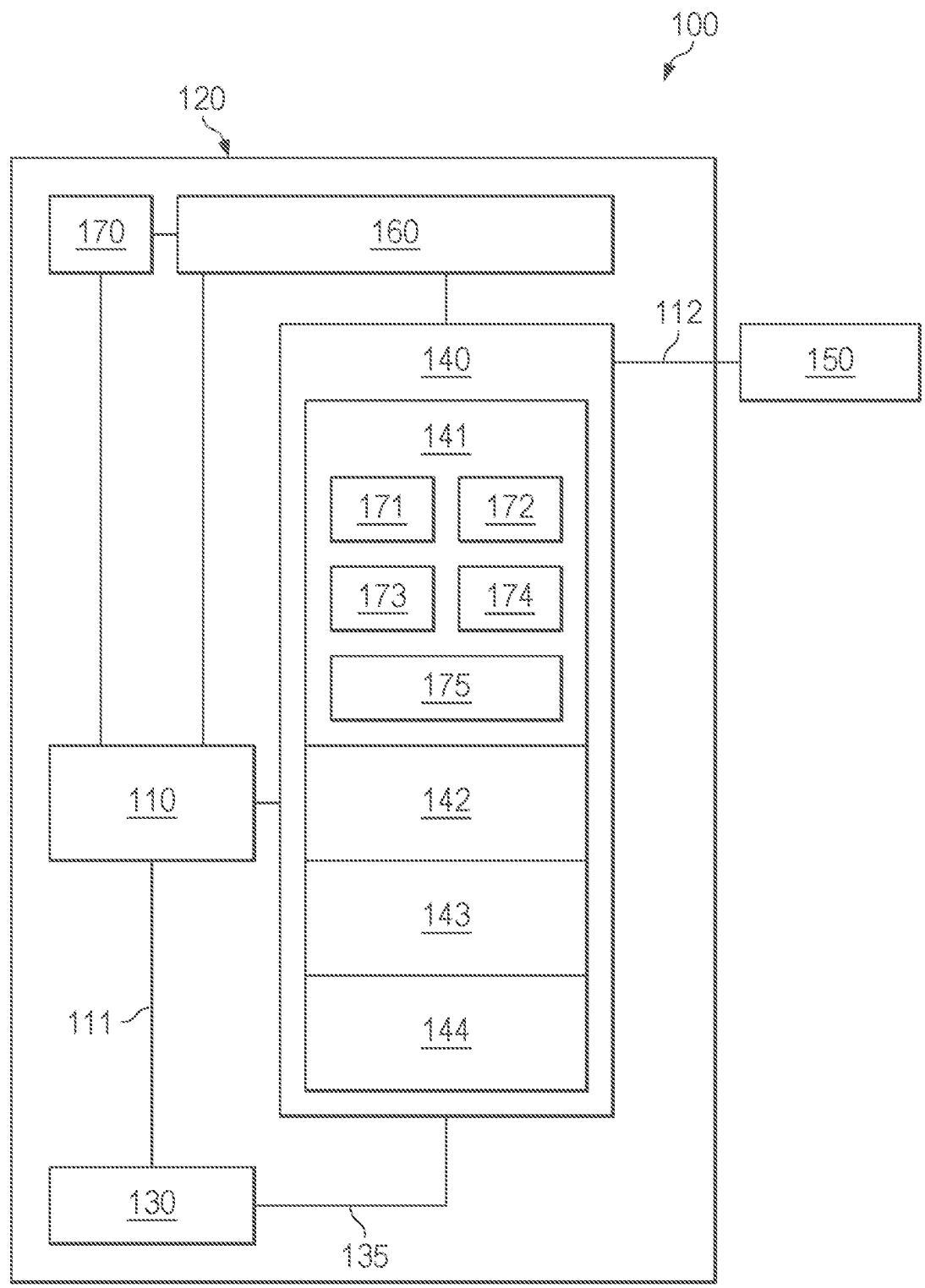
FIG. 1 illustrates one of various examples of a device for communication including a microcontroller and an external peripheral connected over communication bus.

FIG. 1 illustrates one of various examples of a system 100 including a microcontroller 120 and external peripheral 150. The example of FIG. 1 is illustrated with one external peripheral 150, but this is not intended to be limiting. System 100 may include more than one external peripheral 150. Multiple peripherals may be multiple instances of the same peripheral, or may be instances of different peripherals. Microcontroller 120 may include CPU 110.

CPU 110 may be coupled to internal peripheral 130. Internal peripheral 130 may be one of various examples of peripherals, including but not limited to timers, logic elements, analog-to-digital converters (ADCs), digital-to-analog converters (DACs), pulse-width modulators, Universal Asynchronous Receiver/Transmitters (UARTs), interrupt controllers or counters.

Internal peripheral 130 may generate peripheral output signal 135. Peripheral output signal 135 may be a trigger input to communication circuit 140. Communication circuit 140 may be an I2C controller circuit, or may be a serial peripheral interface (SPI) controller circuit, or may be another type of communication circuit. Communication circuit 140 may generate transactions on communication bus 112. Communication bus 112 may be a shared I2C bus or a shared SPI bus or another type of communication bus.

DMA controller 160 may be coupled to communication circuit 140. DMA controller 160 may transfer data from communication circuit 140 to memory 170, or may transfer data from memory 170 to communication circuit 140.

DMA controller 160 may control data transfers between different memory regions directly, without intervention from the CPU. DMA controller 160 may be programmed to transfer data between different memory locations, move different data sizes, and use different hardware triggers to initiate data transfers. DMA controller 160 may access general purpose registers of microcontroller 120, special function registers of microcontroller 120 or flash memory of microcontroller 120.

DMA controller 160 may include one or more addressing modes, including but not limited to fixed address mode, an increment mode, a decrement mode, a post-increment mode or a post-decrement mode. DMA controller 160 may include programmable source and destination sizes. The DMA controller 160 may be configured to transfer data from a source address to a destination address.

In one of various examples, CPU 110, internal peripheral 130, communication circuit 140, DMA controller 160 and memory 170 may be fabricated on a single semiconductor substrate as part of microcontroller 120. Other circuits not illustrated in FIG. 1 may also be included in microcontroller 120.

In one of various examples, internal peripheral 130 may be a timer. Internal peripheral 130 may be configured by CPU 110 to set a timer duration, timer clock source, and other configurable parameters of internal peripheral 130. In operation, CPU 110 may configure internal peripheral 130 over internal bus 111. In operation, internal peripheral 130 may count a predetermined duration of time based on the configuration of internal peripheral 130, and upon reaching the predetermined duration of time, internal peripheral 130 may assert peripheral output signal 135. Peripheral output signal 135 may be a trigger input to communication circuit 140. Internal peripheral 130 may assert peripheral output signal 135 for a predetermined duration of time, after which peripheral output signal 135 may be de-asserted. Internal peripheral 130 may repeat this timer sequence, or may perform a single timer operation.

Peripheral output signal 135 may be coupled to communication circuit 140. The example illustrated in FIG. 1 includes one internal peripheral 130 and one peripheral output signal 135, but this is not intended to be limiting. System 100 may include multiple internal peripherals and multiple peripheral outputs may be coupled to communication circuit 140. Communication circuit 140 may respond to peripheral output signal 135 based on a plurality of configuration register settings. In one of various examples, communication circuit 140 may include trigger configuration register 141. Trigger configuration register 141 may include one or more configuration settings, including but not limited to a trigger enable setting, a trigger source setting, a read/write select setting, a stop/restart condition setting and an end event output setting.

Trigger configuration register 141 may include a trigger enable setting 171 to enable communication circuit 140 to respond to a trigger event. Trigger enable setting 171 may allow communication circuit 140 to be programmed to respond to a specific trigger event, including but not limited to a transition or level on a signal. Trigger configuration register 141 may be programmed to respond to a transition or level on peripheral output signal 135. In one of various examples, multiple peripheral outputs may be input to communication circuit 140, and trigger configuration register 141 may include a trigger source setting 172 to configure communication circuit 140 to respond to one or more of the multiple peripheral outputs. Trigger configuration register 141 may allow communication circuit 140 to be programmed to respond to a timer output, a logic signal, a sensor output, a GPIO signal, an interrupt signal or other signals not specifically mentioned. When the trigger event is received by communication circuit 140, and communication circuit 140 is programmed to respond to the trigger event, communication circuit 140 may enter a peripheral communication mode. Trigger configuration register 141 may include a read/write select setting 173 to allow communication circuit 140 to respond to the trigger event with either a read operation or a write operation, the read or write operation to be transmitted over communication bus 112 by communication circuit 140. Trigger configuration register 141 may include a stop/restart condition 174 setting to allow communication circuit 140 to be programmed to issue a STOP condition over communication bus 112 at the conclusion of the peripheral communication mode. Trigger configuration register 141 may include an end event output setting 175 to specify one or more interrupt outputs to be generated by communication circuit 140 upon conclusion of the peripheral communication mode.

In one of various examples, communication circuit 140 may include address configuration register 142. Address configuration register 142 may store an address value of external peripheral 150. The address value may be an I2C address of external peripheral 150. The address value may be a register address of a register in external peripheral 150. In this manner, communication circuit 140 may access a specific register location within external peripheral 150. Communication circuit 140 may write to the address stored in address configuration register 142 over communication bus 112 or may read from the address stored in address configuration register 142 over communication bus 112. Communication circuit 140 may write to, and read from, the address stored in address configuration register 142 in an I2C communication mode. Communication circuit 140 may write to, and read from, the address stored in address configuration register 142 in an SPI communication mode.

In one of various examples, communication circuit 140 may include count configuration register 143. Count configuration register 143 may be programmed to store a numerical value, the numerical value to specify a number of bytes of data to be transmitted to external peripheral 150 in a write operation, or to be read from external peripheral 150 in a read operation. The direction of communication (either a write operation or a read operation) may be set by the read/write select setting 173 of trigger configuration register 141.

DMA controller 160 may transfer data between communication circuit 140 and memory 170. DMA controller 160 may be configured by CPU 110 to transfer data from communication circuit 140 to specific locations in memory 170 during a read operation. DMA controller 160 may be configured by CPU 110 to transfer data from a specific location in memory 170 to communication circuit 140 during a write operation. Communication circuit 140 may then transfer data stored in memory 170 on to external peripheral 150. Communication circuit 140 may issue commands to DMA controller 160, the commands including a full flag, an empty flag and a message complete flag. DMA controller 160 may transfer data between communication circuit 140 and memory 170 based at least on the commands received from communication circuit 140.

In one of various examples, communication bus 112 may be an SPI bus. Communication circuit 140 may include chip select configuration register 144 which may specify a GPIO or peripheral pin to be used as a chip select signal. The chip select signal may enable communication circuit 140 to address an external peripheral over an SPI bus.

Communication circuit 140 may include multiple trigger configuration registers 141, multiple address configuration registers 142, multiple count configuration registers 143 and multiple chip select configuration registers 144. In one of various examples, communication circuit 140 may include 4 trigger configuration registers 141, 4 address configuration registers 142, 4 count configuration registers 143, and 4 chip select configuration registers 144. In one of various examples, respective trigger configuration registers 141 may include an associated address configuration register 142, count configuration register 143, and chip select configuration register 144. Trigger configuration registers 141 may, respectively, include a configuration setting specifying which of the address configuration registers 142 applies to the respective trigger configuration registers 141. As one of various examples, multiple trigger configuration registers 141 may be programmed to access the same address location. One trigger may be used to read data from an address, and another trigger may be used to write data to the same address.

End event output setting 175 may specify a transmit register empty interrupt to indicate no additional data is available for transmitting to external peripheral 150. End event output setting 175 may specify a receive register full interrupt to indicate no additional storage space is available for data read from external peripheral 150. End event output setting 175 may specify a message complete interrupt to indicate the completion of message transmission.

In the example illustrated in FIG. 1, external peripheral 150 may be an analog to digital converter (ADC). External peripheral 150 may be programmed over communication bus 112 by communication circuit 140, where communication circuit 140 may receive commands from CPU 110. A trigger configuration register 141 may be programmed with a value, the value configuring communication circuit 140 to respond to a rising edge of peripheral output signal 135. Trigger configuration register 141 may be programmed with a value, the value configuring communication circuit 140 to read data when triggered. Trigger configuration register 141 may be programmed with a value, the value configuring the external peripheral 150 to issue a STOP condition over communication bus 112 after the data is read.

Address configuration register 142 may be programmed with a value, the value corresponding to the address of a register within external peripheral 150. Count configuration register 143 may be programmed with a value of one, this value corresponding to one byte of data to be read from the address stored in address configuration register 142.

DMA controller 160 may be configured by CPU 110 to transfer data from communication circuit 140 to memory 170. DMA controller 160 may be configured to transfer data between communication circuit 140 and memory 170, the configuration to at least provide addresses of source data and destination data, and a count of data blocks to be transferred. Data blocks may be bits, bytes, words or another size of data.

In operation, after configuration is complete, CPU 110 may be placed in a low-power sleep mode. Communication circuit 140, when triggered by a signal, or event, recognized by communication circuit 140 based on the values in trigger configuration register 141, may enter a peripheral communication mode. During the peripheral communication mode, communication circuit 140 may, based on the values programmed in trigger configuration register 141, address configuration register 142 and count configuration register 143, issue transactions on communication bus 112 to read one byte of data from external peripheral 150. This one byte of data may be transferred from communication circuit 140 to memory 170 by DMA controller 160, based on the configuration of DMA controller 160.

After the one byte of data is read from external peripheral 150, the peripheral communication mode may terminate based on settings in trigger configuration register 141. The peripheral communication mode may terminate with transmission of a STOP condition over communication bus 112.

In this manner, data may be read from external peripheral 150 without requiring any ongoing activity from CPU 110. Data read from external peripheral 150 may be stored in memory 170 by DMA controller 160, based on the configuration of DMA controller 160, and may be accessed by other peripherals in microcontroller 120. Data stored in memory 170 may be accessed by microcontroller 120. Data stored in memory 170 by DMA controller 160 and may be accessed by CPU 110.

In this manner, system 100 may copy the contents of one or more registers of an external peripheral 150 to memory 170 within microcontroller 120, which enables the registers of external peripheral 150 to function as memory-mapped internal special function registers of external peripheral 150. Without system 100, registers of external peripheral 150 would need to be accessed through an I2C or SPI interface and data would need to be moved by activity of CPU 110.

Figure 2:
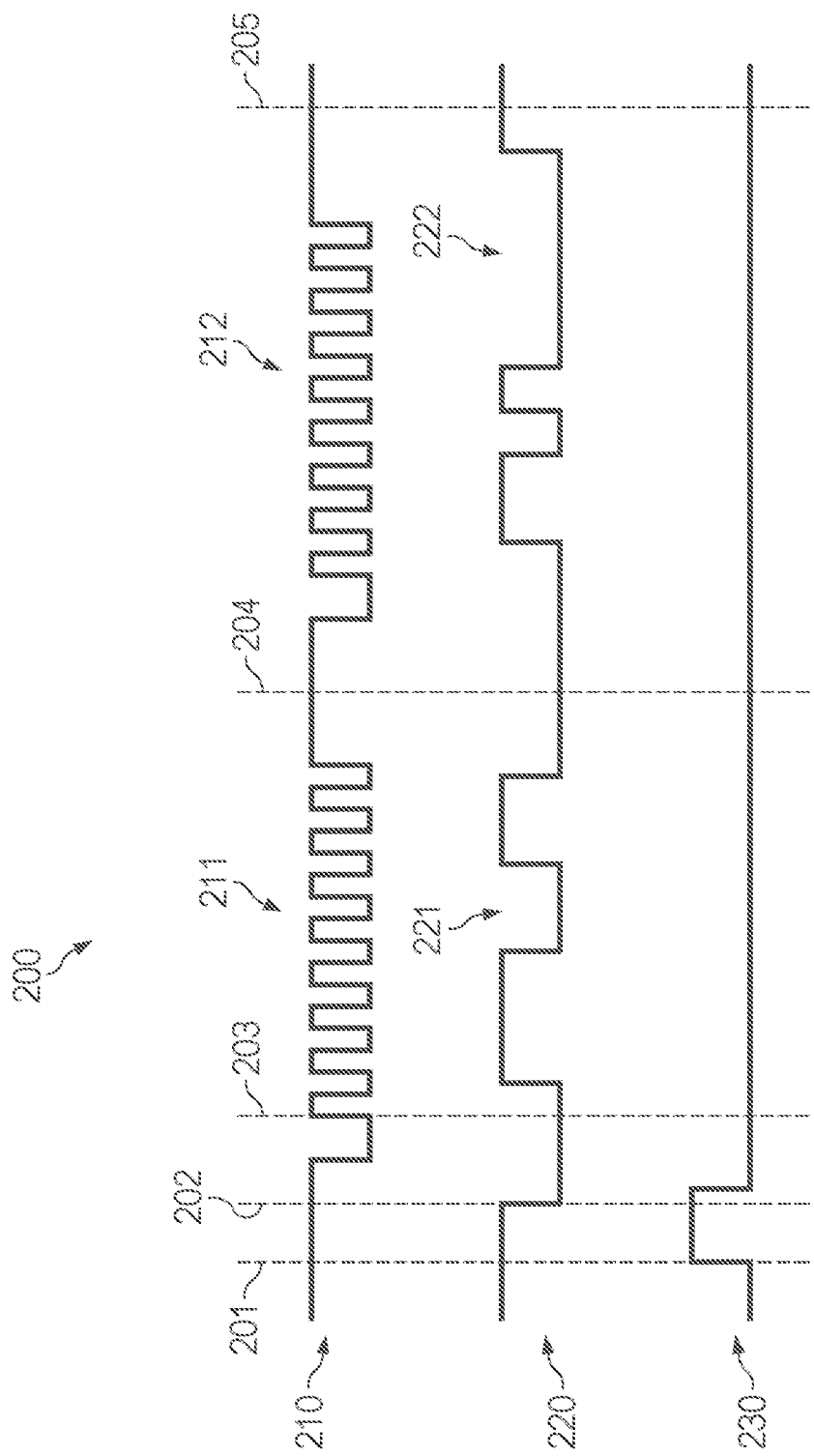
FIG. 2 illustrates one of various examples of a timing diagram of data transmission over a communication bus.

FIG. 2 illustrates one of various examples of transactions on communication bus 112. Transactions illustrated in FIG. 2 may be issued by communication circuit 140 as described and illustrated in reference to FIG. 1. Transactions illustrated in FIG. 2 may represent transactions on a communication bus 112 which may be a shared I2C bus. Trace 210 may be a clock signal. Trace 210 may be an SCL signal on an I2C bus. Trace 220 may be a data signal, an address signal or a combination of an address signal and a data signal. Trace 220 may be an SDA signal on an I2C bus.

Prior to time 201, trigger configuration register 141, address configuration register 142 and count configuration register 143 may be programmed to initiate a write operation to external peripheral 150 when trigger signal 230 is asserted.

At time 201, trigger signal 230 may be asserted and may trigger the write operation to external peripheral 150.

At time 202, communication circuit 140 may issue an I2C START condition on communication bus 112. In examples utilizing an SPI bus, a chip select signal may be asserted (not shown).

At time 203, communication circuit 140 may transmit data to external peripheral 150 on communication bus 112. Trace 210 may include clock pulses 211 and trace 220 may include data transitions 221, where clock pulses 211 and data transitions 221 may communicate the value stored in address configuration register 142. The example illustrated in FIG. 2 includes 8 clock pulses on trace 210, but this is not intended to be limiting. Other examples may include more clock pulses than the number shown in FIG. 2, or may include fewer clock pulses than the number shown in FIG. 2. At time 204, the transmission of the address may be complete, and the data transmission may begin. Trace 210 may include clock pulses 212 and trace 220 may include data transitions 222, where clock pulses 212 and data transitions 222 may write data between communication circuit 140 and external peripheral 150 over communication bus 112. Clock pulses 212 and data transitions 222 may transmit a single byte of data, or may transmit multiple bytes of data, the number of bytes of data transmitted based upon the value stored in count configuration register 143. In the example illustrated in FIG. 2, a single byte of data may be transmitted.

At time 205, a STOP condition may be transmitted on trace 210 and trace 220 on communication bus 112. In examples utilizing an SPI bus, a chip select signal may be de-asserted.

In this manner, a communication circuit may write data to an external peripheral over an I2C bus without requiring interaction or control from a CPU or processor.

Figure 3:
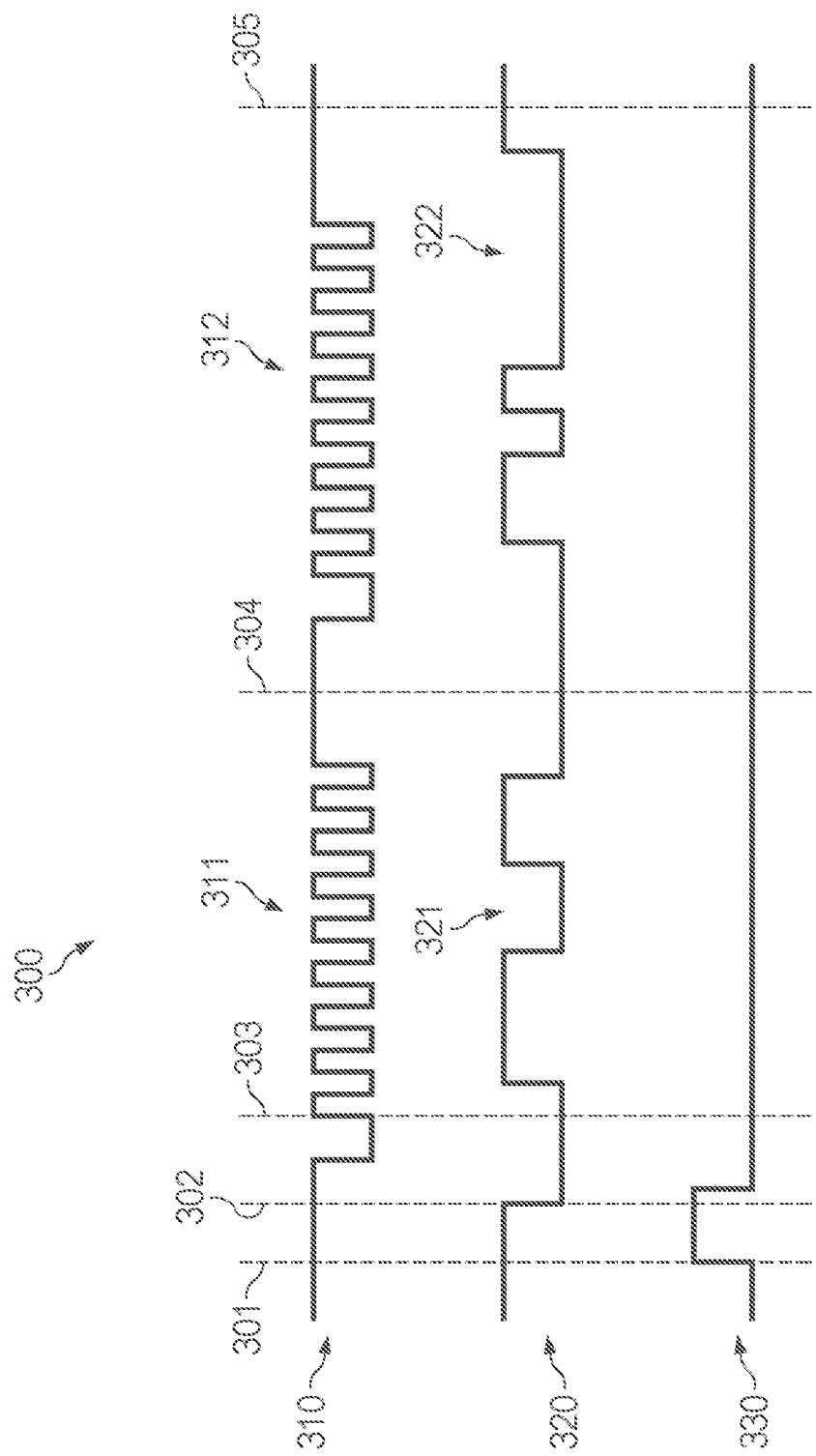
FIG. 3 illustrates another example of a timing diagram of data transmission over a communication bus.

FIG. 3 illustrates another example of transactions on communication bus 112. Transactions illustrated in FIG. 3 may be issued by communication circuit 140 as described and illustrated in reference to FIG. 1. Transactions illustrated in FIG. 3 may represent transactions on a communication bus 112 which may be a shared I2C bus. Trace 310 may be a clock signal. Trace 310 may be an SCL signal on an I2C bus. Trace 320 may be a data signal, an address signal, or a combination address and data signal. Trace 320 may be an SDA signal on an I2C bus.

Prior to time 301, trigger configuration register 141, address configuration register 142 and count configuration register 143 may be programmed to initiate a read operation from a specific address in external peripheral 150 when trigger signal 330 is asserted.

At time 301, trigger signal 330 may be asserted to trigger a read operation from external peripheral 150.

At time 302, communication circuit 140 may issue an I2C START on communication bus 112. In examples utilizing an SPI bus, a chip select signal may be asserted.

At time 303, communication circuit 140 may transmit data on communication bus 112. Trace 310 may include clock pulses 311 and trace 320 may include data transitions 321, where clock pulses 311 and data transition 321 may communicate the value stored in the address configuration register 142 to external peripheral 150. Clock pulses 311 may be transmitted from communication circuit 140 to external peripheral 150 over communication bus 112. Data transitions 321 may be transmitted from the external peripheral 150 to communication circuit 140 over communication bus 112 to enable communication circuit 140 to read data from external peripheral 150.

At time 304, communication circuit 140 may read data from external peripheral 150. In the example illustrated in FIG. 3, clock pulses 312 may be generated by communication circuit 140 and data transitions 322 may be generated by external peripheral 150 and may represent reading a single byte of data. In other examples, communication circuit 140 may read multiple bytes of data, the number of bytes of data read based upon the value stored in count configuration register 143.

At time 305, communication circuit 140 may end the peripheral communication mode by sending a STOP condition on communication bus 112. In examples utilizing an SPI bus, a chip select signal may be de-asserted.

The example of FIG. 3 illustrates a single read operation, but this is not intended to be limiting. The specific bit pattern transmitted and received on trace 320 is not intended to be limiting. In other examples, different bit patterns may be transmitted and received on trace 320.

In this manner, a communication circuit may read data from an external peripheral over an I2C bus without requiring interaction or control from a CPU or processor.

Figure 4:
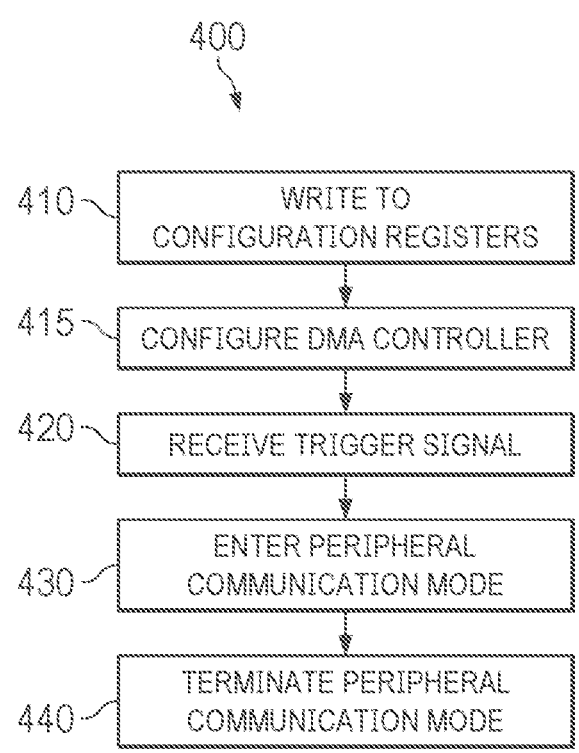
FIG. 4 illustrates a method of communication between electronic components.

FIG. 4 illustrates a method of communication between electronic components.

At operation 410, configuration registers in a communication circuit may be programmed. Configuration registers may include a trigger configuration register, an address configuration register, a count configuration register and a chip select configuration register. Configuration registers may include other configuration registers not specifically mentioned.

At operation 415, a DMA controller may be configured to transfer data between a communication circuit and a memory, the configuration to at least provide addresses of source data and destination data, and a count of data blocks to be transferred. Data blocks may be bits, bytes, words or another size of data.

At operation 420, a trigger signal may be received by the communication circuit. The trigger signal may be a specific signal as specified by values stored in the trigger configuration register.

At operation 430, the communication circuit may enter a peripheral communication mode to communicate with the external peripheral over a communication bus. In one of various examples, the communication circuit may write a number of bytes to a register address of the external peripheral over the communication bus, the number of bytes specified by values stored in the count configuration register, and the register address specified by values stored in the address configuration registers. In one of various examples, the communication circuit may read a number of bytes from a register address of the external peripheral over the communication bus, the number of bytes specified by values stored in the count configuration register, and the register address specified by values stored in the address configuration register. In one of various examples, the communication circuit may assert a chip select signal to enable communication to a specific external peripheral.

At operation 440, the peripheral communication mode may be terminated by a STOP condition based upon values stored in the trigger configuration register.

At operation 450, the DMA controller may transfer data between the communication circuit and the memory, based on the configuration of the DMA controller.

The invention claimed is:

1. A device comprising:
a microcontroller comprising a communication circuit, a central processing unit (CPU), a direct-memory access (DMA) controller and a memory, the communication circuit coupled to the CPU, the DMA controller and an external peripheral, the communication circuit comprising:
a trigger configuration register to store trigger configuration settings;
an address configuration register to store an address of the external peripheral;
a count configuration register to store a numerical value;
at least one trigger input;
wherein the communication circuit:
enters a peripheral communication mode based on the trigger configuration settings and a trigger event on the at least one trigger input;
transfers a number of bytes between the communication circuit and the external peripheral addressed by the address stored in the address configuration register, the number of bytes transferred based on the numerical value stored in the count register;
exits the peripheral communication mode based on completion of the transfer of the number of bytes and based on the trigger configuration settings, and
the DMA controller to transfer data between the communication circuit and the memory.

2. The device as claimed in claim 1, the trigger configuration settings comprising a trigger enable setting, a trigger source setting, a read/write select setting, a stop/restart condition setting, and an end event output setting.

3. The device as claimed in claim 2, the end event output setting to specify one or more interrupt outputs comprising at least one of a transmit register empty interrupt, a receive register full interrupt, and a message complete interrupt.

4. The device as claimed in claim 1, the communication circuit comprising a chip select configuration register.

5. The device as claimed in claim 1, the DMA controller to transfer data between the communication circuit and one or more general purpose registers within the microcontroller.

6. The device as claimed in claim 1, wherein transfers a number of bytes comprises reading a number of bytes from the external peripheral.

7. The device as claimed in claim 1, wherein transfers a number of bytes comprises writing a number of bytes to the external peripheral.

8. A communication system comprising:
an external peripheral;
a microcontroller coupled to the external peripheral, the microcontroller comprising a communication circuit, a CPU, a DMA controller and a memory, the communication circuit to couple to the CPU and the DMA controller, the communication circuit comprising:
a trigger configuration register to store trigger configuration settings;
an address configuration register to store an address of the external peripheral;
a count register to store a numerical value;
at least one trigger input;
wherein the communication circuit:
enters a peripheral communication mode based on trigger configuration settings in the trigger configuration register and a trigger event on the at least one trigger input;
transfers a number of bytes between the communication circuit and the external peripheral addressed by the address stored in the address configuration register, the number of bytes transferred based on the numerical value stored in the count register;
exits the peripheral communication mode based on configuration settings in the trigger configuration register, and
the DMA controller to transfer data between the communication circuit and a memory.

9. The system as claimed in claim 8, the trigger configuration settings comprising a trigger enable setting, a trigger source setting, a read/write select setting, a stop/restart condition setting, and an end event output setting.

10. The system as claimed in claim 9, the end event output setting to specify one or more interrupt outputs comprising at least one of a transmit register empty interrupt, a receive register full interrupt, and a message complete interrupt for triggering DMA transfers.

11. The system as claimed in claim 8, the communication circuit comprising a chip select configuration register.

12. The system as claimed in claim 8, the DMA controller to transfer data between the communication circuit and one or more general purpose registers within the microcontroller.

13. The system as claimed in claim 8, the DMA controller configured to transfer data from a source address to a destination address.

14. A method for communication with an external peripheral comprising:
writing to one or more configuration registers in a communication circuit;

configuring a DMA controller to transfer data between the communication circuit and a memory;

receiving a trigger signal at the communication circuit, the trigger signal specified by values stored in at least one of the configuration registers;

transferring data between an external peripheral and the communication circuit, the address of the external peripheral based upon a value stored in at least one the configuration registers, and the number of bytes of data to transfer based on a numerical value stored in at least one of the configuration registers;

terminating the communication based upon completion of the transferring of data and based on a value stored in at least one of the configuration registers, and transferring data between the communication circuit and the memory based on the configuration of the DMA controller.

15. The method as claimed in claim 14, the configuration registers comprising one or more trigger configuration registers, one or more address configuration registers, and one or more count registers.

16. The method as claimed in claim 14, the configuration registers comprising one or more chip select configuration registers.

17. The method as claimed in claim 14, the trigger configuration registers comprising a trigger enable setting, a trigger source setting, a read/write select setting, a stop/restart condition setting, and an end event output setting.

18. The method as claimed in claim 17, the end event output setting to specify one or more interrupt outputs comprising at least one of a transmit register empty interrupt, a receive register full interrupt, and a message complete interrupt for triggering DMA transfers.

19. The method as claimed in claim 14, the DMA controller to transfer data between the communication circuit and one or more general purpose registers within the microcontroller.

* * * * *